Patented Aug. 1, 1950

2,517,076

UNITED STATES PATENT OFFICE 2,517,076

COMPOSITION FOR INHIBITING SAP STAIN

Leslie R. Bacon and Dwight B. Conklin, Wyandotte, Mich., assignors to Wyandotte Chemicals Corporation, Wyandotte, Mich., a corporation of Michigan No Drawing. Application June 9, 1948, Serial No. 32,044

15 Claims. (Cl. 167—38.7)

The present invention relates to a chemical composition for preventing or inhibiting sap stain and mold growth in green wood and lumber. Sap stain, often times alternatively referred to as "blue stain," is a bluish or blue blackish discoloration within the body of the wood. It is caused by the growth of fungi, one of the most prominent of which is the species Ceratostomella pilifera. Sap stain is to be differentiated from mold growths which occur on the surface of the wood and which vary widely in color according to the characteristics of the several organisms which may develop.

A great many chemical compositions for inhibiting sap stain or mold growth in green wood have heretofore been devised. However, in most cases it has been found that such compositions were not capable of inhibiting both sap stain and mold growth. The composition of U. S. Patent No. 2,392,987 is capable of inhibiting both sap stain and mold growth.

Our present invention constitutes an improvement in the composition of the aforesaid patent, in that we have discovered certain inorganic compounds which upon addition to the parent composition consisting of borax, modified soda and sodium pentachlorophenate, result in a still greater sap stain preventive action, and impart a synergistic effect to our new compositions as a whole.

The composition of U. S. Patent No. 2,392,987 is disclosed as comprising by weight, 20–50% borax ($Na_2B_4O_7.10H_2O$), 30–50% modified soda which is a molecular combination of sodium carbonate and sodium bicarbonate corresponding substantially to the empirical formula:

$$Na_2CO_3.1.6NaHCO_3.2H_2O$$

and 20–40% sodium pentachlorophenate. We have discovered, that by incorporating 5–70% parts by weight with the said patented composition to make a total of 100 parts of the improved composition, of a metal or ammonium halide selected from the group consisting of ammonium silicofluoride, magnesium silicofluoride, zinc silicofluoride and mercuric chloride, that even a still greater control or inhibition of sap stain can be obtained. In other words, by incorporating one of these last named additive agents in the parent mixture of borax, modified soda and sodium pentachlorophenate, not only is mold growth completely prevented, but the sap stain inhibition action is greatly improved. This result was not to be expected, inasmuch as compounds such as ammonium silicofluoride and zinc silicofluoride alone, for example, usually failed to prevent mold growth when used at 1% concentration or higher.

The compositions of our invention are preferably employed by being made up in an aqueous solution of 5–20 pounds of composition per 100 gallons of water. The green wood or lumber to be treated is then dipped or immersed in such aqueous solution and after dipping, stacked in the customary manner in the lumber yard and allowed to air dry for the usual period of three or four months.

Exemplary formulations embodying the principle of our invention are as follows:

| Ingredients | Per Cent by Weight, Solids Basis |
|---|---|
| Borax | 8–20 |
| Modified Soda | 12–20 |
| Sodium Pentachlorophenate | 8–16 |
| Ammonium Silicofluoride, Magnesium silicofluoride or Zinc silicofluoride | 50–70 |

Exemplary formulations in which mercuric chloride is used as the additive agent, conform to the following:

| Ingredients | Per Cent by Weight, Solids Basis |
|---|---|
| Borax | 18–45 |
| Modified Soda | 28–45 |
| Sodium Pentachlorophenate | 20–40 |
| Mercuric Chloride | 5–10 |

Compositions made according to the above stated formulation ranges were made up and subjected to the following test:

Test specimens of southern yellow pine in the form of circular blocks transversely cut from the sapwood of young trees were inoculated with a viable culture of the fungus Ceratostomella pilifera. Four of such specimen blocks were used for each test composition. The test compositions were made up into aqueous solutions in the concentration as noted and applied to the fungus-inoculated blocks. Blocks were then maintained at a temperature of 82° F. and approximately 100% relative humidity for an incubation period of five weeks. At the end of such five weeks period, the area of sapwood stained on both the top and bottom surfaces of the four test blocks was measured and the average thereof noted. Observations were made as to the degree of mold growth on the surface of the blocks. These test results are tabulated as follows:

| Composition | Per Cent Ingredients Solids Basis | Per Cent Concentration in H₂O Solution | Average Per Cent of Sapwood Stained | Extraneous Mold Attack |
|---|---|---|---|---|
| No. 1 (Control): | | | | |
| Borax | 50 | | | |
| Modified Soda | 30 | 0.625 | 100 | None |
| Sodium Pentachlorophenate | 20 | | | |
| No. 1 (Control) | Same as above | 1.25 | 68.1 | Do. |
| No. 1 (Control) | Same as above | 2.5 | 0.0 | Do. |
| No. 2: | | | | |
| Borax | 20 | | | |
| Modified Soda | 12 | 1.625 | 1.8 | Do. |
| Sodium Pentachlorophenate | 8 | | | |
| Ammonium Silicofluoride | 60 | | | |
| No. 3: | | | | |
| Borax | 20 | | | |
| Modified Soda | 12 | 1.625 | 4.4 | Do. |
| Sodium Pentachlorophenate | 8 | | | |
| Magnesium Silicofluoride | 60 | | | |
| No. 4: | | | | |
| Borax | 20 | | | |
| Modified Soda | 12 | 1.625 | 0.0 | Do. |
| Sodium Pentachlorophenate | 8 | | | |
| Zinc Silicofluoride | 60 | | | |
| No. 5: | | | | |
| Borax | 45 | | | |
| Modified Soda | 28 | 0.675 | 0.0 | Do. |
| Sodium Pentachlorophenate | 20 | | | |
| Mercuric Chloride | 7 | | | |

The above described laboratory tests have been found to be more severe than field tests. It will be seen from these laboratory tests that a 2.5% concentration aqueous solution of the control formula (Formula No. 1 in the above table) is necessary in order to obtain a zero reading for the average per cent of sapwood stained. It will thus be seen, that by virtue of the additive agents of our invention, to the parent borax-modified soda-sodium pentachlorophenate mixture, a substantially smaller concentration is required for an equivalent degree of control.

The ingredients of the compositions given in the foregoing table were employed in the form in which they are usually, commercially available; i. e., some of the chemical ingredients were in the hydrated form and others were in the anhydrous form. Thus, sodium pentachlorophenate, ammonium silicofluoride and mercuric chloride were employed in the anhydrous form; and borax, modified soda, magnesium silicofluoride and zinc silicofluoride were employed in the hydrated form, containing the number of moles of molecularly combined water as customarily present in the commercially available form of the particular chemical compound. Our invention however is equally well operable when the ingredients are employed in either the hydrated or anhydrous forms. Thus, in the appended claims, the definition of the ingredients of the composition should be understood as including the hydrated and anhydrous forms as equivalents.

Equivalent modes of practicing our invention may be followed provided that they are within the scope and purview of the appended claims.

We, therefore, distinctly claim and particularly point out as our invention:

1. A composition for inhibiting sap stain and mold growth in green wood comprising a mixture of borax, modified soda and sodium pentachlorophenate and an additive agent selected from the group consisting of ammonium silicofluoride, magnesium silicofluoride, and zinc silicofluoride.

2. A composition for inhibiting sap stain and mold growth in green wood comprising a mixture of 20–50% borax, 30–50% modified soda, and 20–40% sodium pentachlorophenate, and an added 5–70 parts by weight on the basis of 100 parts of total composition, of a compound selected from the group consisting of ammonium silicofluoride, magnesium silicofluoride, and zinc silicofluoride.

3. A composition for inhibiting sap stain and mold growth in green wood comprising a mixture of 8–20% by weight borax, 12–20% modified soda, 8–16% sodium pentachlorophenate and 50–70% ammonium silicofluoride.

4. A composition for inhibiting sap stain and mold growth in green wood comprising a mixture of 8–20% by weight borax, 12–20% modified soda, 8–16% sodium pentachlorophenate and 50–70% magnesium silicofluoride.

5. A composition for inhibiting sap stain and mold growth in green wood comprising a mixture of 8–20% by weight borax, 12–20% modified soda, 8–16% sodium pentachlorophenate and 50–70% zince silicofluoride.

6. A composition for inhibiting sap stain and mold growth in green wood consisting essentially of 20% by weight borax, 12% modified soda, 8% sodium pentachlorophenate and 60% ammonium silicofluoride.

7. A composition for inhibiting sap stain and mold growth in green wood consisting essentially of 20% by weight borax, 12% modified soda, 8% sodium pentachlorophenate and 60% magnesium silicofluoride.

8. A composition for inhibiting sap stain and mold growth in green wood consisting essentially of 20% by weight borax, 12% modified soda, 8% sodium pentachlorophenate and 60% zinc silicofluoride.

9. An aqueous solution bath for treating green wood to inhibit sap stain and mold growth comprising 5–20 pounds per 100 gallons of water of the composition of claim 2.

10. An aqueous solution bath for treating green wood to inhibit sap stain and mold growth comprising 5–20 pounds per 100 gallons of water of the composition of claim 3.

11. An aqueous solution bath for treating green wood to inhibit sap stain and mold growth comprising 5–20 pounds per 100 gallons of water of the composition of claim 4.

12. An aqueous solution bath for treating green wood to inhibit sap stain and mold growth comprising 5–20 pounds per 100 gallons of water of the composition of claim 5.

13. An aqueous solution bath for treating green wood to inhibit sap stain and mold growth comprising 5-20 pounds per 100 gallons of water of the composition of claim 6.

14. An aqueous solution bath for treating green wood to inhibit sap stain and mold growth comprising 5-20 pounds per 100 gallons of water of the composition of claim 7.

15. An aqueous solution bath for treating green wood to inhibit sap stain and mold growth comprising 5-20 pounds per 100 gallons of water of the composition of claim 8.

LESLIE R. BACON.
DWIGHT B. CONKLIN.

REFERENCES CITED

The following references are of record in the file of this patent:

UNITED STATES PATENTS

| Number | Name | Date |
|---|---|---|
| 1,473,899 | Bodmar | Nov. 13, 1923 |
| 2,152,160 | Steinherz | Mar. 28, 1939 |
| 2,392,987 | Hill | Jan. 15, 1946 |

FOREIGN PATENTS

| Number | Country | Date |
|---|---|---|
| 266,296 | Great Britain | Oct. 6, 1927 |
| 102,457 | Australia | Nov. 8, 1937 |

OTHER REFERENCES

Scheffer: "Stains of Sapwood and Sapwood Products and Their Control," U. S. Dept. of Agriculture Tech. Bulletin #714, Mar. 1940, pages 116-119.